W. V. TURNER.
FLUID PRESSURE BRAKE.
APPLICATION FILED APR. 8, 1918.
1,314,168. Patented Aug. 26, 1919.
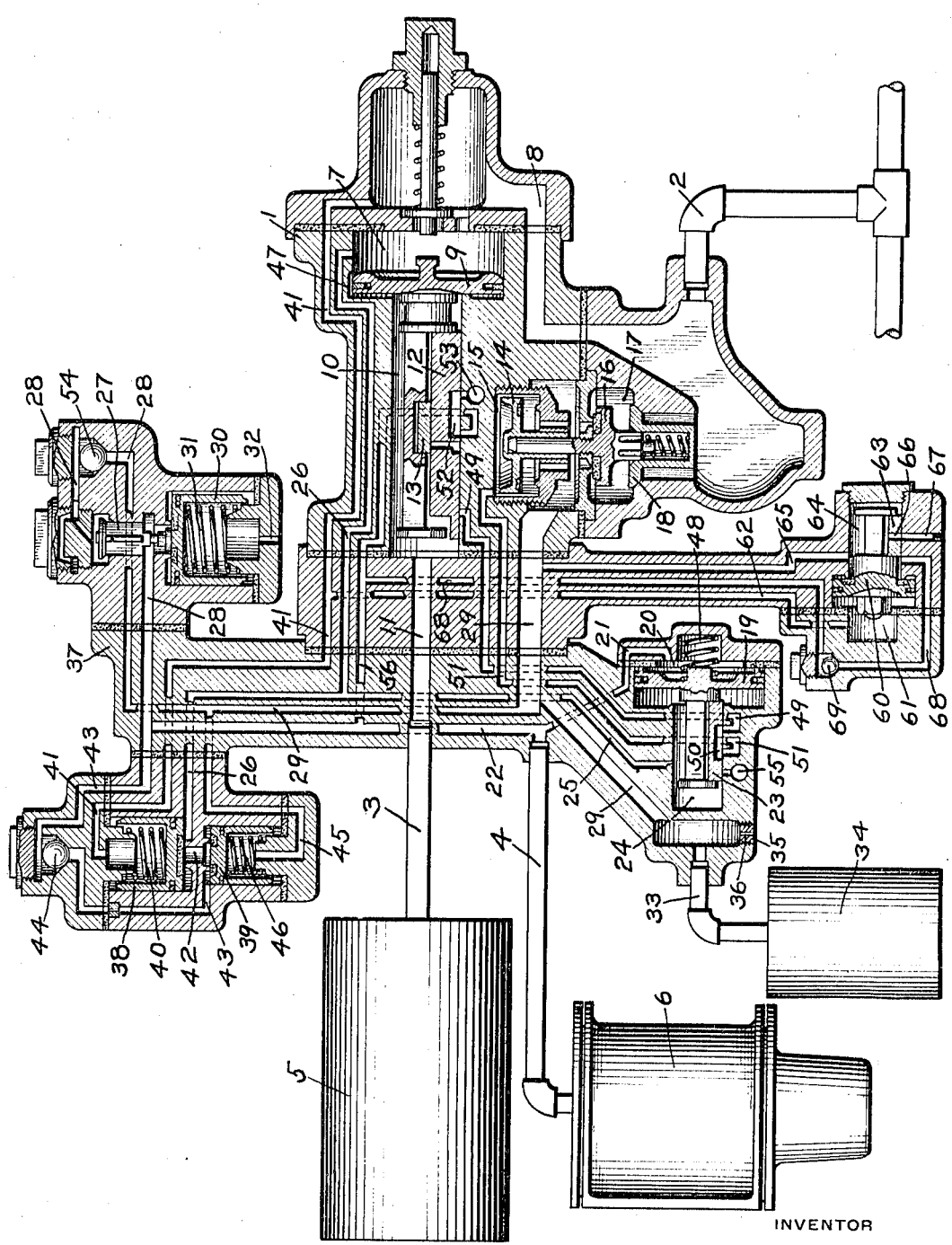
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,314,168.     Specification of Letters Patent.     Patented Aug. 26, 1919.

Application filed April 8, 1918. Serial No. 227,178.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes, and more particularly to an improvement on the construction covered by my prior patent application, Serial No. 139,764, filed December 30, 1916.

In the accompanying drawing, the single figure is a sectional view of a valve device embodying my invention.

As shown in the drawing, the equipment may comprise a triple valve device 1 connected to brake pipe 2, by pipe 3 to auxiliary reservoir 5, and by pipe 4 to brake cylinder 6.

The triple valve device 1 may comprise a casing having a piston chamber 7 connected by passage 8 to brake pipe 2 and containing piston 9 and having a valve chamber 10 connected by passage 11 to auxiliary reservoir 5 and containing a main slide valve 12 and a graduating slide valve 13 adapted to be operated by piston 9.

The triple valve casing also contains a quick action valve mechanism comprising a piston 14, loosely mounted in piston chamber 15, for operating a quick action valve 16, contained in valve chamber 17, the usual check valve 18 being interposed between the brake pipe passage 8 and valve chamber 17.

According to the construction covered by my prior application, hereinbefore referred to, communication through which fluid under pressure in the quick action piston chamber 15 is varied, is adapted to be controlled by a valve device mounted in a casing 37 and comprising a piston 19 contained in piston chamber 20, which is connected by a passage 21 with brake cylinder passage 22, and a slide valve 23, contained in valve chamber 24, which is connected by a passage 25 with passage 26, leading to triple valve piston chamber 7.

Flow of fluid from the brake pipe to the brake cylinder is controlled by a valve 27, located in a passage 28, leading from vent passage 29 to brake cylinder passage 22, and said valve is adapted to be actuated by a piston 30, normally subject on one side over a restricted area to brake cylinder pressure and on the opposite side to the pressure of a spring 31, this side of the piston being open to the atmosphere, through passage 32.

Connected to the vent passage 29 by pipe 33 is a timing reservoir 34, and for slowly reducing the pressure in said timing reservoir, a choke plug 35 is provided, having a restricted passage 36, leading from passage 29 to the atmosphere.

The casing 37 also contains valve pistons 38 and 39, the valve piston 38 being subject on one side to the pressure of a spring 40 and to fluid pressure supplied through a passage 41, leading to brake pipe passage 8.

The outer area of the opposite side of valve piston 38 is connected to passage 26, and the inner seated area, to a passage 42, leading to the inner seated area of valve piston 39. The outer area of this side of valve piston 39 is connected by a passage 43, containing check valve 44, with brake cylinder passage 22, and the opposite side of said valve piston is connected by passage 45, with brake pipe vent passage 29, and is subject to the pressure of a spring 46.

According to the present invention, an additional valve device is provided for venting fluid from the timing reservoir 34 and the brake pipe to the atmosphere and to the brake cylinder directly, where the rate of reduction in brake pipe pressure in an emergency application of the brakes is below or less than a predetermined rate.

This valve device may comprise a piston 60, contained in piston chamber 61, which is connected by passage 62 with passage 41, and a slide valve 63, contained in valve chamber 64, which is connected by a passage 65 with brake pipe vent passage 29.

When the slide valve 63 is in its inner position, as shown in the drawing, a port 66 registers with a restricted atmospheric exhaust passage 67 and valve chamber 64 is also connected to a passage 68, containing a check valve 69, and leading to brake cylinder passage 22.

In operation, fluid supplied to brake pipe 2 flows to piston chamber 7 and thence, through the usual feed groove 47, to valve chamber 10 and the auxiliary reservoir 5.

The valve chamber 24 is also charged with fluid under pressure from the brake pipe, as supplied through passages 26 and 25, and since the opposite side of piston 19 is connected to the brake cylinder, the brake pipe pressure in valve chamber 24, normally maintains the piston in the position shown in the drawings, against the resistance of spring 48.

With the piston 19 in the above position, valve 23 connects a passage 49, leading from the seat of slide valve 12, through cavity 50, with a passage 51, leading to the quick action piston chamber 15, and main slide valve 12 being in release position, the passage 49 is blanked.

The valve piston 38 is held seated, as shown, by brake pipe pressure applied through passage 41, and since the valve piston 39 is now subject on opposite sides to atmospheric pressure, the spring 46 holds the same in its seated position.

Upon a sudden reduction in brake pipe pressure, to effect an emergency application of the brakes, the triple valve piston 9 moves the slide valve 12, so as to uncover passage 49 and permit flow of fluid from the auxiliary reservoir through cavity 50 and passage 51 to quick action piston chamber 15. The quick action piston 14 is then operated to open quick action valve 1, so that fluid is vented from the brake pipe, by the lifting of check valve 18, through passage 29, passage 28, past check valve 54 and the open valve 27 to brake cylinder passage 22 and thence to the brake cylinder 6.

Fluid is also vented from the brake pipe through passage 29 to the reduction reservoir 34.

Since at the beginning of an emergency application of the brakes, fluid is supplied to the brake cylinder through a restricted port, the build up of pressure in the brake cylinder is slow, and this permits the brakes to be applied at the rear end of the train, before a sufficient brake cylinder pressure is obtained on the cars at the head end of the train, to cause shocks by the running in of the rear cars.

When the brake cylinder pressure acting on the seated area of piston 30 has increased to a predetermined low degree, as determined by the spring 31, the valve piston 30 will be shifted from its seat, and since the full area is then exposed to brake cylinder pressure, the same will be promptly shifted to its outer seat, permitting the valve 27 to close and cut off the further admission of fluid from the brake pipe to the brake cylinder.

The movement of triple valve piston 9 to emergency position, connects passage 26 with the auxiliary reservoir side of the piston, so that fluid at auxiliary reservoir pressure is supplied to the outer area of valve piston 38, while the opposite side of the piston is still subject to brake pipe pressure, and when the brake pipe pressure has been reduced to a predetermined degree, the auxiliary reservoir pressure overcomes the opposing brake pipe pressure, and the valve piston 38 is lifted from its seat, exposing the full area to auxiliary reservoir pressure, so that the said valve piston is promptly shifted to its upper seat, permitting fluid from the auxiliary reservoir to flow through passage 42 to the seated area of valve piston 39.

Fluid under pressure supplied to the timing reservoir 34 and to the spring side of valve piston 39, slowly escapes through the restricted port 36, and when the pressure has reduced to a predetermined degree, the auxiliary reservoir pressure admitted to the seated area of the valve piston 39 will be sufficient to lift the same from its seat, exposing the full area to auxiliary reservoir pressure, so that the valve piston is quickly shifted to its outer seat, permitting fluid from the auxiliary reservoir to flow, through passage 43, past check valve 44, to passage 22, and thence to the brake cylinder.

When the brake cylinder and auxiliary reservoir pressures, acting on the opposite sides of piston 19, have substantially equalized, the spring 48 will operate the piston, and the valve 23 will be shifted, so as to connect passage 51 with exhaust port 55. Fluid is thereupon vented from the quick action piston 14, so that the same will be shifted to normal position, permitting the quick action valve 16 to close.

Upon increasing the brake pipe pressure to effect the release of the brakes, the triple valve piston 9 is shifted to release position, in which the brake cylinder is connected to the exhaust through passage 22, passage 56, cavity 52, and exhaust port 53.

Passage 26 is again connected to the brake pipe side of piston 9, so that fluid pressures on opposite sides of the valve piston 38 are equalized, permitting the spring 40 to move same to its inner seat.

The release of fluid from the brake cylinder, reduces the pressure on the upper face of valve piston 30, permitting spring 31 to shift the valve piston to its upper seat and thereby open the valve 37.

As so far described, the operation corresponds substantially with that of the construction covered by my hereinbefore mentioned prior patent application.

According to the present improvement, if the rate of reduction in bake pipe pressure is above a predetermined rate, as would be the case at the head end of the train, the pressure in piston chamber 61 will be reduced, by flow through passages 62 and 41, to the brake pipe, below the pressure in valve chamber 64, which is suddenly supplied with fluid from the brake pipe through passage 65, when the quick action valve opens, and consequently the piston 60 will be operated to shift the valve 63, so that the venting of fluid from the valve chamber 64 is cut off and thus the operation of the apparatus is the same as hereinbefore described.

If, however, the brake pipe pressure does not fall at the predetermined emergency rate, as might be the case on cars at the rear of the train, then the fluid pressures on the opposite sides of the piston 60 will remain substantially balanced, so that the piston 60 will not be shifted from its normal position. As a consequence, the valve chamber 69 remains open through port 66 to exhaust port 67 and also to the passage 68, so that fluid is vented from the timing reservoir 34 to the atmosphere and to the brake cylinder by way of the valve 63, causing a more rapid reduction in pressure in the brake pipe and said reservoir than under normal conditions. Since the operation of the valve piston 39 depends upon the reduction in pressure in the timing reservoir, it will be evident that said valve piston will be operated at an earlier period under the above conditions, and consequently the flow of fluid from the auxiliary reservoir to the brake cylinder is hastened, so that on the rear cars of the train, where the rate of reduction in brake pipe pressure is lower, the final brake application occurs at an earlier period, with the result that a more nearly simultaneous application of the brakes throughout the train is produced.

The above operation also tends to locally reduce the brake pipe pressure more rapidly than under normal conditions and therefore increases the rate of serial propagation of quick action through the train.

If the brake pipe pressure is reducing at the normal emergency rate, the venting of fluid from the timing reservoir 34 through the restricted port 36 will cause the operation of the auxiliary reservoir pressure controlling valve piston 39 at the desired time, but if the brake pipe pressure is reducing at a lower rate, then fluid will continue to flow from the brake pipe past the check valve 18 to the timing reservoir, so that a longer period of time would elapse before the valve piston 39 could operate, and so the primary object of employing the additional valve device of the present invention is to secure an increased venting of fluid from the timing reservoir to take care of the further flow of air from the brake pipe to the timing reservoir and thus cause the operation of the valve piston 39 in the same time or even more quickly, if desired, than is the case where the brake pipe reduction is at normal emergency rate.

Having now described my invention, what I claim as new and desire to secure by Letters Patent, is:

1. In a fluid pressure brake, the combination with a brake pipe, a timing reservoir, and a valve device operated upon a predetermined reduction in pressure in the timing reservoir for effecting an application of the brakes, of means operated according to the rate of reduction in brake pipe pressure for effecting a more rapid reduction in pressure in the timing reservoir.

2. In a fluid pressure brake, the combination with a brake pipe, auxiliary reservoir, brake cylinder, a timing reservoir, and a valve device operated upon a predetermined reduction in pressure in the timing reservoir for supplying fluid from the auxiliary reservoir to the brake cylinder, of a means operated at a low rate of reduction in brake pipe pressure for more rapidly reducing the pressure in the timing reservoir.

3. In a fluid pressure brake, the combination with a brake pipe, auxiliary reservoir, brake cylinder, a timing reservoir, and a valve device operated upon a predetermined reduction in pressure in the timing reservoir for supplying fluid from the auxiliary reservoir to the brake cylinder, of a valve device subject to the opposing pressures of the brake pipe and the timing reservoir for venting fluid from said timing reservoir.

4. In a fluid pressure brake, the combination with a brake pipe, auxiliary reservoir, brake cylinder, a timing reservoir, and a valve device operated upon a predetermined reduction in pressure in the timing reservoir for supplying fluid from the auxiliary reservoir to the brake cylinder, of a valve device subject to the opposing pressures of the brake pipe and the timing reservoir for venting fluid from the timing reservoir to the atmosphere and to the brake cylinder.

5. In a fluid pressure brake, the combination with a brake pipe, auxiliary reservoir, brake cylinder, a timing reservoir, open to a restricted exhaust port and adapted to be charged with fluid vented from the brake pipe, and a valve device operated upon a predetermined reduction in pressure in the timing reservoir for supplying fluid from the auxiliary reservoir to the brake cylinder, of a valve device operated at a predetermined low rate of reduction in brake pipe pressure for also venting fluid from said timing reservoir.

In testimony whereof I have hereunto set my hand.

WALTER V. TURNER.